April 19, 1966  J. J. MONAHAN  3,246,779
APPARATUS FOR FEEDING PARTS
Filed April 15, 1964  4 Sheets-Sheet 1
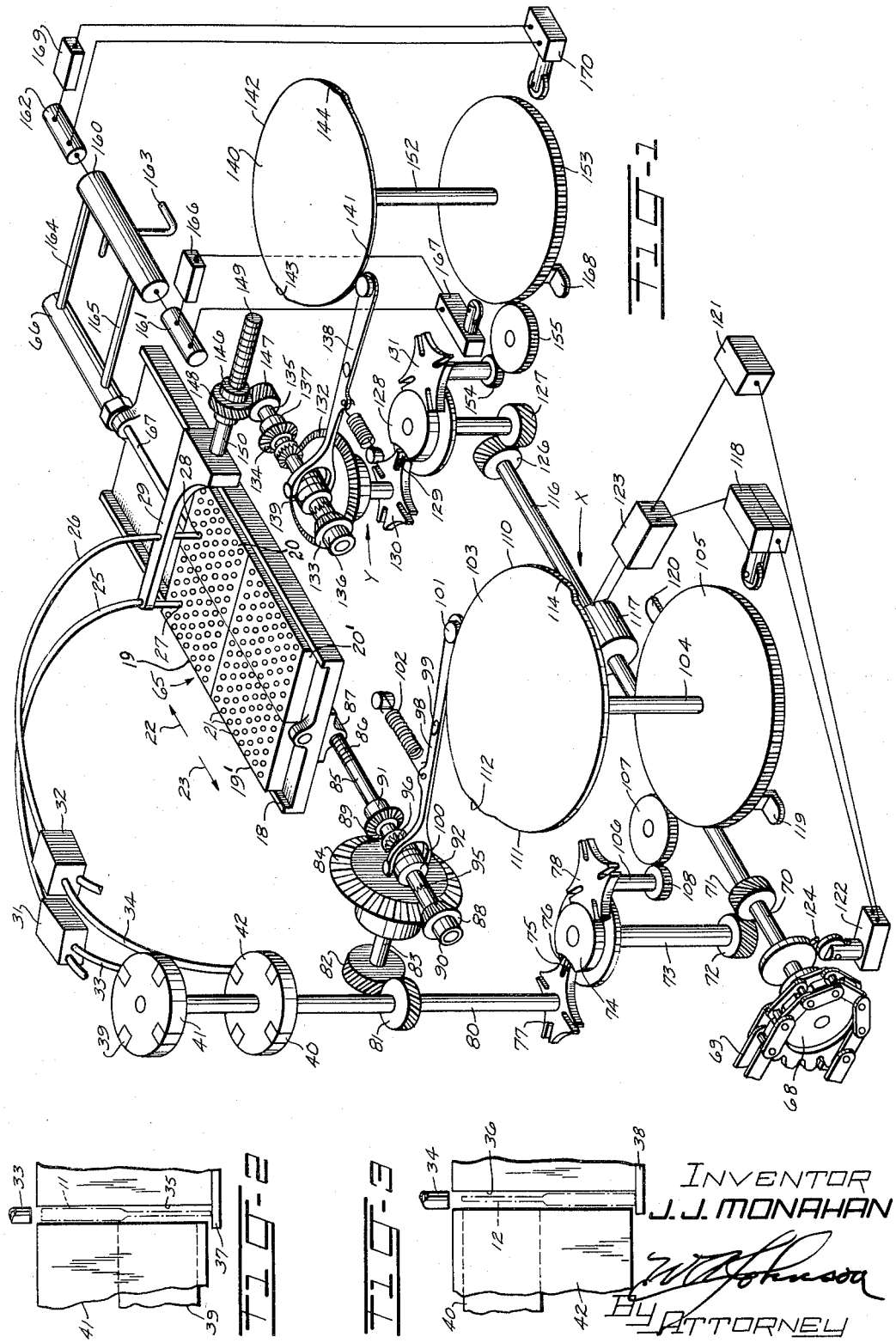
INVENTOR
J. J. MONAHAN
BY ATTORNEY

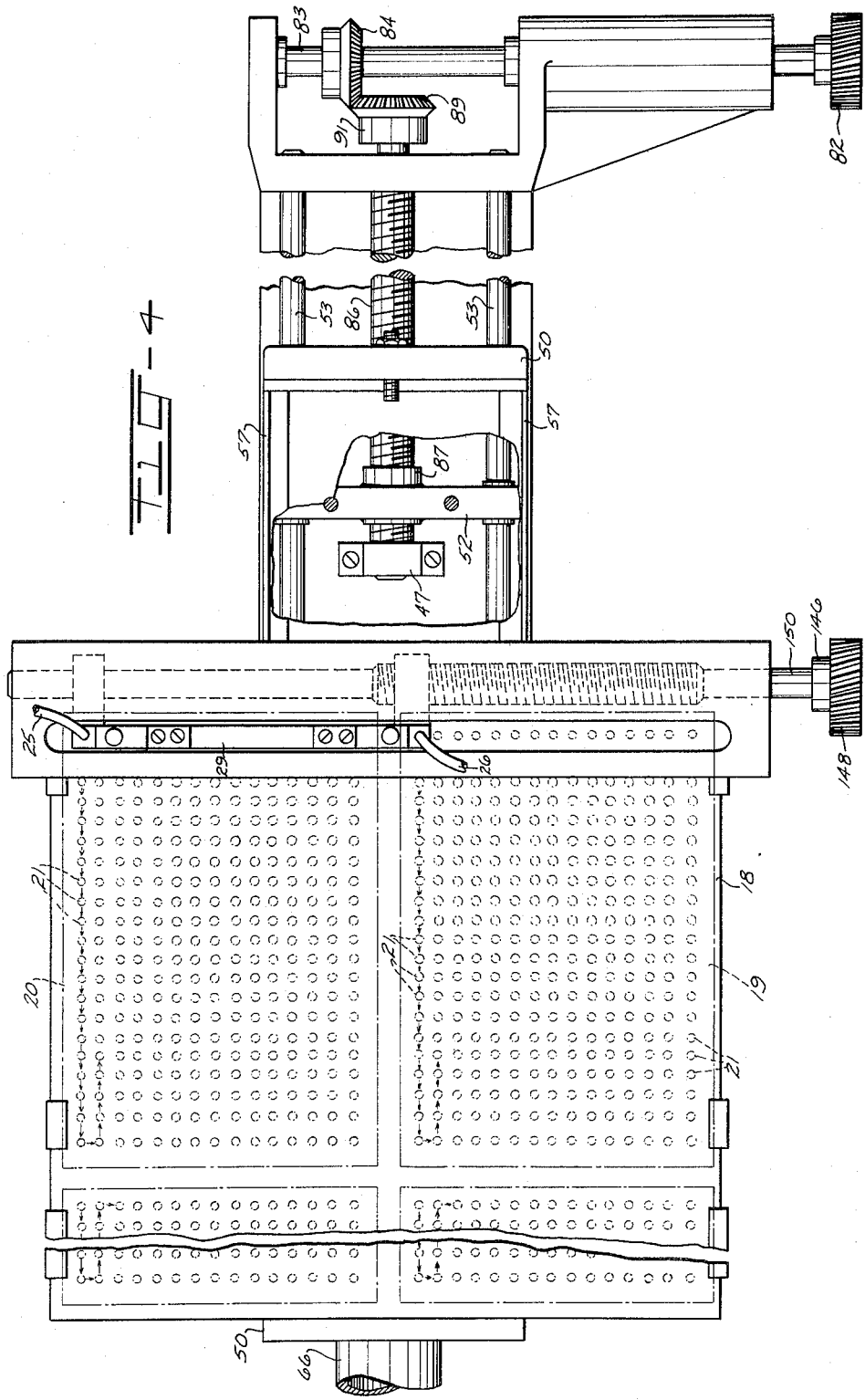

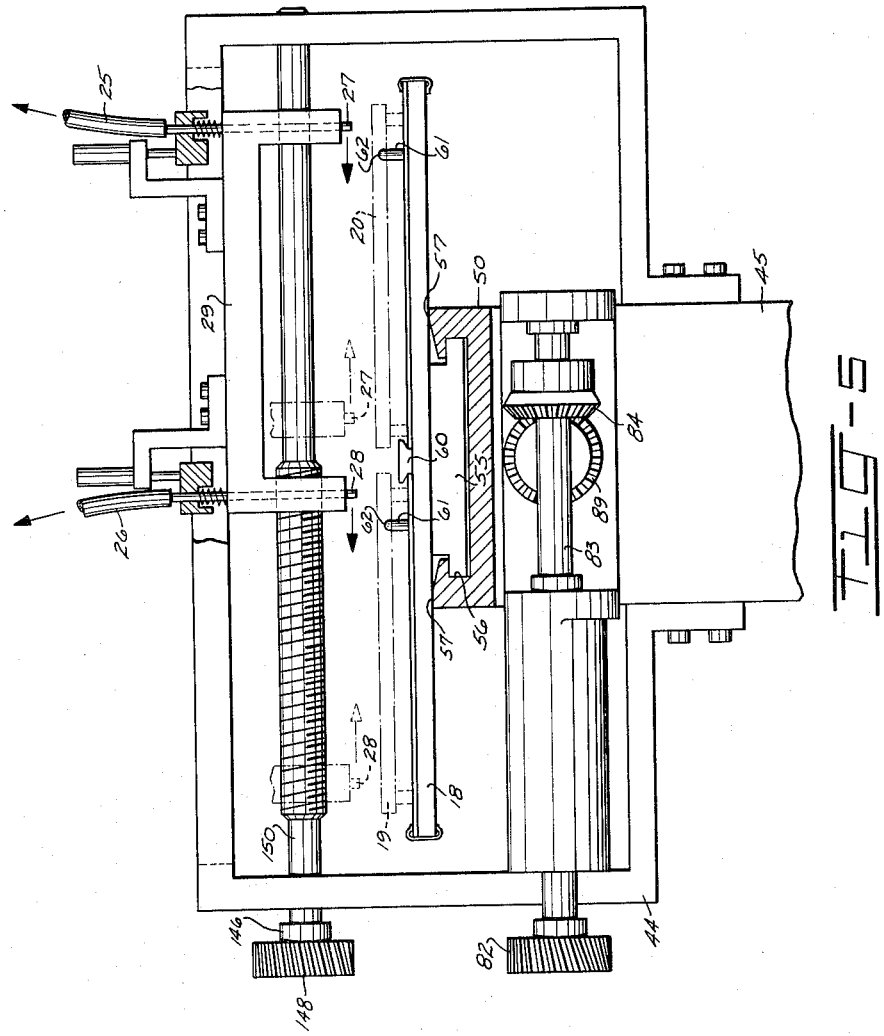

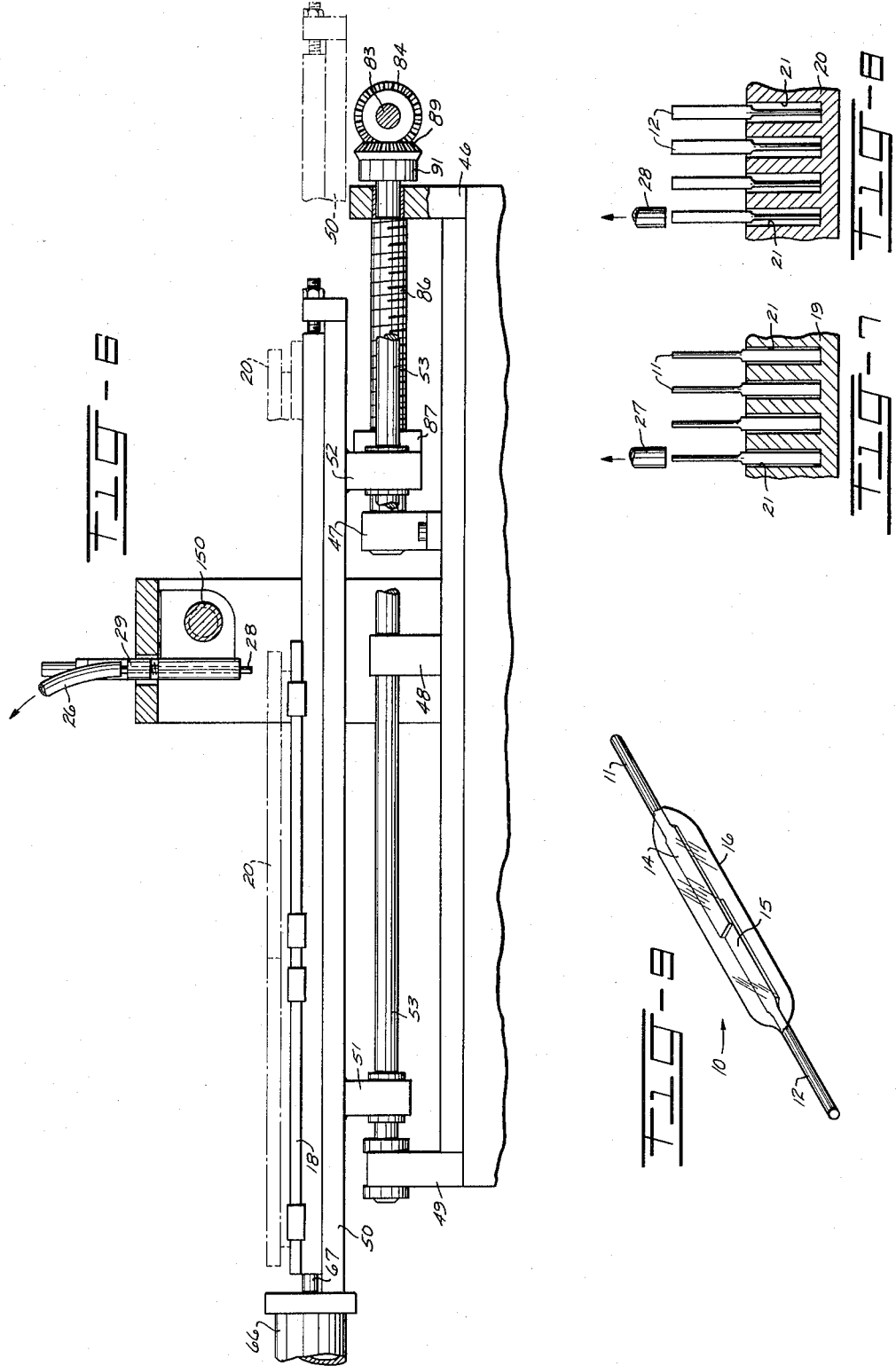

United States Patent Office 3,246,779
Patented Apr. 19, 1966

3,246,779
APPARATUS FOR FEEDING PARTS
Jack J. Monahan, Allentown, Pa., assignor to Western Electric Company, Incorporated, a corporation of New York
Filed Apr. 15, 1964, Ser. No. 360,044
14 Claims. (Cl. 214—309)

This invention relates to apparatus for feeding parts, particularly first and second contacts for three-piece switches.

In the manufacture of three-piece switches composed of a pair of contacts with flat end portions in overlapping relationship housed in glass tubes, one of the problems is the feeding of the contacts in proper orientation to the switch assembly machine.

The object of the present invention is to provide an apparatus which is highly efficient and accurate to continuously feed the contacts simultaneously to receivers therefor.

In accordance with the object, the invention includes a carriage adapted to support trays having like spaced rows of nests for individually supporting parts, a vacuum chute adapted to remove the parts singly from the tray in a predetermined order and separate means to move the tray and the chute to successively position the nests of the tray in registration with the chute until all of the parts have been removed.

Other objects and advantages will be apparent from the following detailed description when considered in conjunction with the accompanying drawings wherein:

FIG. 1 is a schematic isometric view of the apparatus;

FIG. 2 is a fragmentary view of a receiver for one of the parts;

FIG. 3 is a fragmentary detailed view of the receiver for the other of the parts;

FIG. 4 is a fragmentary top plan view of a portion of the apparatus;

FIG. 5 is an end elevational view of the structure shown in FIG. 4;

FIG. 6 is a side elevational view of the structure shown in FIG. 4;

FIGS. 7 and 8 are fragmentary sectional views of the pair of trays for the respective parts; and FIG. 9 is an isometric view of a finished switch including a pair of the parts.

*Product of the machine*

The product of the machine, with which this apparatus is to be associated, is a switch indicated generally at 10 in FIG. 9 which includes a pair of parts 11 and 12, further identified in the present instance as top and bottom contacts with flat inner portions 14 and 15 disposed in overlapping spaced relation and sealed in a glass tube 16.

*Apparatus in general*

In viewing FIG. 1, it will be seen that a carriage 18 is supporting a pair of trays 19 and 20, in what may be defined as an unloading or feeding position, and a pair of trays 19' and 20' in a position ready to be fed to the feeding position. The trays have parallel rows of nests 21 individually supporting in parallel vertical position the parts 11 and 12. A control unit, indicated generally at X, is operated to move the carriage 18 intermittently in the direction of an arrow 22 until one row of the nests 21 has been emptied and then in the direction of an arrow 23 until the next row of nests of both trays have been emptied, this action continuing until the trays are empty. Vacuum chutes 25 and 26, having entrance ends 27 and 28, respectively, are supported near the entrance ends by an arm 29 and disposed at spaced positions so that their entrance ends may register with identical nests of their respective trays. A control unit, indicated generally at Y, is operated intermittently after the emptying of one row of nests of each tray to move the entrance ends 27 and 28 of the vacuum chutes 25 and 26 to the next row in each tray. Suitable vacuum creating units 31 and 32 are operatively connected to the vacuum chutes 25 and 26, respectively, and are simultaneously operated intermittently so that the parts aligned with the entrance ends of their chutes will be drawn upwardly into the chutes. The parts are drawn with sufficient rapidity so that after the units 31 and 32 become ineffective the parts will continue to travel through their chutes to their exit ends 33 and 34 where they may drop into their respective receivers 35 and 36 (FIGS. 2 and 3). The receivers are provided with stops 37 and 38, respectively, to support and locate the parts until they are magnetically held by members 39 and 40 of their respective transfer members 41 and 42. The transfer members 41 and 42 subsequently are operated as described hereinafter, to move the parts properly oriented to the machine.

*Carriage for the trays*

As seen in FIGS. 4, 5 and 6, the carriage 18 for the trays 19–20 and 19' and 20' includes a frame 44 mounted on a support 45 and having vertical supports for bearing members 46, 47, 48 and 49 mounted thereon. A table 50 has downwardly extending bearing members 51 and 52 mounted on spaced parallel rods 53 which are supported by the vertical bearing members 46, 48 and 49 so that the table 50 may be moved longitudinally on the supporting rods. The carriage 18 has a connecting member 55 mounted on its under surface as shown in FIG. 5 and is positioned to move longitudinally in a guideway 56 of the table 50, the carriage resting upon spaced upper surfaces 57 of the table. The upper surface of the carriage 18 is provided with a central locating member 60 and also locating pins 61 fixed to the carriage and adapted to extend into locating apertures or recesses 62 of the trays 19, 19' 20 and 20'. The carriage is of sufficient size to provide areas for supporting two pairs of loaded trays 19 and 20 and 19'–20', respectively, so that when one pair of trays 19, 20 is in the feeding or unloading position, indicated generally at 65, there is room on the carriage after an empty pair of trays has been removed to place another loaded pair of trays thereon. An air cylinder 66, supported by the table 50 and disposed at one end thereof, has its piston rod 67 connected to the adjacent end of the carriage to bring about movement of the carriage on the table in alternately reverse directions to move the filled pair of trays 19', 20' into the unloading position 65 after the pair of trays 19, 20 in this position has been emptied and moved out of the feeding position. The means for operating the air cylinder 66 will be described hereinafter.

*Control unit X*

The control unit X includes the drive for advancing the table 50 with the carriage 18 alternately in the directions of the arrows 22 and 23 to move the trays 19 and 20 relative to the entrance ends 27 and 28 of the vacuum chutes 25 and 26. The drive for the control unit X originates at 68, which in this instance, is a sprocket driven continuously by a chain 69 from a power source (not shown), this drive being associated with the driving means for the switch assembling machine so that the contacts 11 and 12 may be fed successively thereto. The sprocket 68 is mounted on the end of a drive shaft 70 which carries a fixed gear 71 interengaging a gear 72 mounted on a shaft 73. A Geneva driving member 74, mounted on the shaft 73, carries a pin 75 adjacent an arcuate area 76, the pin being adapted to alternately engage Geneva driven members 77 and 78 to cause these members to move alternately through quarter turns. The driven member 77 is mounted on the lower end of a shaft 80, which has the transfer members 41 and 42 mounted thereon at upper portions of the shaft. A gear 81, mounted on the shaft 80, interengages a gear 82, which is mounted on one end of a shaft 83, a bevelled or bull gear 84 being mounted on the other end of this shaft. A drive shaft 85 for the table 50 has a threaded portion 86 extending through a nut 87 which is fixed to the under surface of the table 50. The shaft 85 is held against axial movement and has bevelled gears 88 and 89 held in their respective positions thereon by collars 90 and 91 so that they will interengage the bull gear 84 and be driven freely in opposing directions thereon. An intermediate clutch member 92 is disposed concentric with the shaft 85 intermediate the gears 88 and 89 and keyed to the shaft 85 so that whenever the clutch member 92 interengages the bevelled gear 88, as at 95, the shaft 85 will be rotated to move the carriage in the direction of the arrow 22, but when it is moved to engage the gear 89, at 96, the shaft 85 will be rotated to move the carriage in the direction of the arrow 23. A lever 98, pivotally supported at 99, has a bifurcated end 100 operatively connected to the clutch member 92. A roller or cam follower 101 is mounted at the other end of the lever 98 and urged by a spring 102 to follow the contour of a cam 103. The cam 103 is mounted on the upper end of a shaft 104 which has a gear 105 fixed thereto, the gear 105 being operatively connected to a shaft 106 of the driven member 78 through an intermediate gear 107 and a gear 108 mounted on the shaft 106. Therefore, the cam 103, through its driving connection with the driven Geneva member 78, is moved intermittently a predetermined distance determined by the size of the gear 107 and particularly the number of nests in each row of the trays 19 and 20. The cam 103 is composed mainly of a high portion 110, a low portion 111, and diametrically opposed intermediate portions 112 and 114. The high portion 110, as shown in FIG. 1, causes actuation of the lever 98 to cause the clutch 92 to engage the gear 88 to move the carriage in the direction of the arrow 22, this action continues until the end nests of those like rows of the trays 19 and 20 have been moved beneath the inlet ends 27 and 28 of the vacuum chutes 25 and 26. During the next movement, the cam follower 101 will engage either intermediate portion 112 or 114 at which time the clutch 92 will be moved between the two gears 88 and 89 and held for one operating movement out of engagement with both gears 88 and 89. At this time, the control Y will be operated to shift the arm 29 and the entrance ends 27 and 28 of the vacuum chutes to the next row of nests. Before leaving the control unit X, it should be understood that the next operating movement thereof will bring the low portion 111 of the cam 103 into engagement with the cam follower 101 rendering the spring 102 effective to move the lever and the clutch 92 for engagement of the shaft 95 through the clutch with the gear 89. This causes the shaft 85 during its intermittent turns to move the carriage 18 in the direction of the arrow 23 during the driving action of the control unit X. The shaft 80, after each quarter turn, moves the transfer members 41 and 42 to transfer presently received parts 11 and 12 toward the machine and present successive magnetic members 39 and 40 of the transfer members to receive the succeeding parts.

Control unit Y

The control unit Y is very similar to the control unit X, but is operated only once at the completion of each series of operations of the control unit X to shift the entrance ends 27 and 28 of the vacuum chutes 25 and 26 to the next adjacent row of nests of their respective trays when the preceding rows have been emptied. The drive for the unit Y originates with a shaft 116 adapted to be connected to the shaft 70 through a one-revolution clutch 117, the clutch 117 being held inactive while the cam follower 101 of the unit X rides on either the high portion 110 or the low portion 111 of the cam 103. However, during the periods when the cam follower 101 engages either intermediate portion 112 or 114 of the cam 103, a switch 118 is closed by respective member 119 or 120 of the gear 105. The switch 118 is in a circuit with a power source 121, a switch 122 and a clutch actuator 123. The switch 122 is actuated intermittently by a pin 124 during each cycle of the shaft 70 so that through the two switches 118 and 122 the clutch actuator 123 will be energized at the proper time to cause the clutch 117 to drive the shaft 116 for one cycle of operation.

The shaft 116, through gears 126 and 127, causes intermittent rotation of a Geneva drive 128, a pin 129 of which alternately causes quarter rotations of driven members 130 and 131. The driven member 130 drives a bull gear 132 which is provided with freely rotating bevelled gears 133 and 134 held on their shaft 135 by collars 136 and 137. A cam lever 138, operatively connected to clutch member 139, is under the control of a cam 140 so that a low portion 141 thereof will result in the clutch 139 operatively connecting the gear 133 to the shaft 135. A high portion 142, of the cam 140, causes connection of the shaft 135 to the gear 137 through the clutch 139 whereas intermediate portions 143 and 144 of the cam 140 cause the clutch 139 to be positioned free of gears 133 and 134. The shaft 135 is operatively connected to a shaft 149, through gears 147 and 148. The gear 148 is held against axial movement by a nut 146. The threaded shaft 149 extends through the nut 146 and has an end 150 affixed to the arm 29. The cam 140, mounted on a shaft 152 connected to a gear 153, is driven by the Geneva driven member 131 through gears 154 and 155. This drive results in shifting the arm from one position to another to advance the entrance ends 27 and 28 of the chutes 25 and 26 from the ends of one row of nests in each tray to the ends of adjacent rows.

The air cylinder 66, FIG. 1, is under the control of a valve 160 of a conventional type which may be actuated by solenoids 161 and 162 to direct air under pressure from a supply line 163 through line 164 when solenoid 161 is energized and through line 165 when solenoid 162 is energized. The solenoid 161 is in a circuit connected to a source of electrical energy 166 and a switch 167 which is moved into, closed position by a projection 168 on the gear 153 when the trays 19 and 20, at the unloading station 65, have been emptied and the next filled pair of trays 19', 20' are to be moved into the unloading station. The solenoid 162 is in a circuit, connected to a source of electrical energy 169, with a switch 170, so that the same action may take place when the new set of filled trays 19, 20, have been emptied to shift said trays in the opposite direction from the unloading station and another filled pair of trays (not shown) into position.

Operation

At the start of an operating interval, let it be assumed that a pair of filled trays 19 and 20 are located, through the member 60, FIG. 5, and the locating pins 61, in the feeding or unloading station on the carriage. At that same time, if desired, or at any time during the unloading of trays 19, 20, the next pair of filled trays 19', 20' may be located on the carriage. The apparatus is so arranged that regardless of where the various parts may be when the operation of the apparatus has stopped, for example, at the end of one working day, the starting of the apparatus at the next working day will cause the apparatus to begin where it left off and continue its function without any disturbances. If the operation of the apparatus begins with new filled trays 19 and 20 in the unloading station 65, the entrance ends 27 and 28 of the vacuum chute will be located at what may be called a first row of nests for each tray depending upon the position of the control unit X. When the apparatus is set in operation in conjunction with the switch assembling machine, the control unit X will cause intermittent movements of the carriage 18 until one row of nests in each tray has been emptied and at that time, the clutch 117 will be caused to operate through one cycle to impart through the shaft 116 one operating movement of the control unit Y to move the arm 29 to shift the entrance ends of the chutes to the next row of nests in the trays. This action of the control unit Y takes place during what may be defined as an idle interval of the control unit X so that, during the interval, the carriage 18 is not moved longitudinally and the next pair of parts removed are those located in the end nests of the next row of nests. These actions continue with the control unit X operating to advance the carriage in one direction until like rows of nests in the trays are emptied and the carriage held idle until the control unit Y operates through one interval to shift the chutes to the next row of nests to pick up the first parts 11 and 12 therefrom, after which the control unit Y remains idle and the control unit X has reversed the direction and causes intermittent movements of the carriage in this reverse direction to align the successive parts in the new row of nests with the chutes. These actions continue automatically until one pair of trays have been emptied of their parts and through quick action, without loss of any feeding time of the parts, the carriage 18 is shifted through operation of the air cylinder 66 to move out the empty trays and bring up the next pair of filled trays so that the first parts from the new tray may be removed in time for the next feeding operation. These actions occur when both cams 103 and 140 are at their idle or inactive positions with the cam follower 101 of the cam 103 at either position 112 or 114 and the cam follower of the lever 138 at either position 143 or 144. As a result, all that is required of the operator is to remove the empty trays when they are moved out of the unloading position and place new filled trays on the carriage.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for feeding parts successively to a receiver comprising:
   trays having spaced rows of nests therein with the nests equally spaced in each row for supporting the parts,
   a carriage for supporting the trays successively in a feeding position,
   a vacuum chute having an entrance end and an exit end, the exit end being disposed adjacent the receiver,
   an arm, supporting the chute adjacent the entrance end thereof, adapted to locate said entrance end in registration with successive rows of nests in the feeding position, and
   a first unit operable to intermittently advance the carriage predetermined distances to successively position the nests of each row in registration with said entrance end of the chute.

2. An apparatus for feeding parts according to claim 1 in which:
   a second unit is operable to move the arm to transfer said entrance end of the chute from registration with one row of nests, when said one row of nests becomes empty, to a filled row of nests.

3. An apparatus for feeding parts according to claim 1 in which:
   a second unit is operable to move the arm to transfer said entrance end of the chute from registration with one row of nests, when said one row of nests becomes empty, to a filled row of nests, and
   means responsive to the first unit to cause operation of the second unit when said one row of nests is empty.

4. An apparatus for feeding parts according to claim 1 in which:
   a second unit is operable to move the arm to transfer said entrance end of the chute from registration with one row of nests, when said one row of nests becomes empty, to a filled row of nests, and
   means embodied in said first unit to render it unoperable to move the carriage during operation of the second unit.

5. An apparatus for feeding parts according to claim 1 in which:
   a second unit is operable to move the arm to transfer said entrance end of the chute from registration with one row of nests, when said one row of nests becomes empty, to a filled row of nests, and
   means operable to transfer a tray, when empty, from the feeding position and a full tray into the feeding position.

6. An apparatus for feeding parts according to claim 1 in which:
   a second unit is operable to move the arm to transfer said entrance end of the chute from registration with one row of nests, when said one row of nests becomes empty, to a filled row of nests,
   means operable to transfer a tray, when empty, from the feeding position and a full tray into the feeding position, and
   separate means embodied in said units to render them unoperable during operation of said transfer means.

7. An apparatus for feeding parts according to claim 1 in which:
   a second unit is operable to move the arm to transfer said entrance end of the chute from registration with one row of nests, when said one row of nests becomes empty, to a filled row of nests,
   means operable to transfer a tray, when empty, from the feeding position and a full tray into the feeding position, and,
   means responsive to the second unit to cause operation of the transfer means.

8. An apparatus for feeding parts according to claim 1 in which:
   a second unit is operable to move the arm to transfer said entrance end of the chute from registration with one row of nests, when said one row of nests becomes empty, to a filled row of nests, and
   means embodied in said first unit to cause intermittent movements of the carriage, alternately in reverse directions, for locating the nests in successive rows in registration with the entrance end of the chute.

9. An apparatus for feeding parts according to claim 1 in which:
   a second unit is operable to move the arm to transfer said entrance end of the chute from registration with one row of nests, when said one row of nests becomes empty, to a filled row of nests,
   means embodied in said first unit to cause intermittent movements of the carriage, alternately in reverse directions, for locating the nests in successive rows in registration with the entrance end of the chute, and
   further means embodied in said first unit to render it unoperable to move the carriage during operation of said second unit.

10. An apparatus for feeding parts according to claim 1 in which:
    a second unit is operable to move the arm to transfer said entrance end of the chute from registration with one row of nests, when said one row of nests becomes empty, to a filled row of nests, and
    means embodied in said second unit to move the arm alternately in reverse directions for advancing the entrance end of the chute to successive rows of nests in successive trays.

11. An apparatus for feeding parts according to claim 1 in which:
    a second unit is operable to move the arm to transfer said entrance end of the chute from registration with one row of nests, when said one row of nests becomes empty, to a filled row of nests, and a vacuum creating unit connected to said chute intermediate its ends and operable intermittently to remove the parts successively from the tray nests to the receiver.

12. An apparatus for feeding first and second parts to receivers therefor comprising:

like pairs of trays having like spaced rows of nests therein with the nests equally spaced in each row for individually supporting the first and second parts, a carriage adapted to support a pair of said trays in a feeding position, a pair of vacuum chutes having entrance ends and exit ends, the exit ends being disposed adjacent their respective receivers, an arm for supporting the chutes adjacent the entrance ends thereof and adapted to locate said entrance ends in registration with like rows of nests in the pair of trays in the feeding position, and a first unit operable to intermittently advance the carriage predetermined distances to successively position the nests in registration with said entrance ends.

13. An apparatus for feeding first and second parts according to claim 1 in which:

a second unit is operable to move the arm to transfer said entrance ends of the chutes from registration with one row of nests of their respective trays when empty to the next filled row of nests.

14. An apparatus for feeding first and second parts according to claim 1 in which:

a second unit is operable to move the arm to transfer said entrance ends of the chutes from registration with one row of nests of their respective trays, when empty, to the next filled row of nests, and vacuum creating units connected to said chutes intermediate the ends thereof and operable intermittently to remove the parts successively from the tray nests to the receivers.

References Cited by the Examiner

UNITED STATES PATENTS

| | | | |
|---|---|---|---|
| 1,987,336 | 1/1935 | Powell | 214—309 X |
| 2,108,906 | 2/1938 | Speckhart et al. | 53—282 |
| 2,643,160 | 6/1953 | Zeig | 302—34 X |
| 2,988,237 | 6/1961 | Devol | 214—11 |

GERALD M. FORLENZA, *Primary Examiner.*